United States Patent
Doshi

(10) Patent No.: US 10,536,700 B1
(45) Date of Patent: Jan. 14, 2020

(54) SYSTEMS AND METHODS FOR ENCODING VIDEOS BASED ON VISUALS CAPTURED WITHIN THE VIDEOS

(71) Applicant: GoPro, Inc., San Mateo, CA (US)

(72) Inventor: Sandeep Doshi, Sunnyvale, CA (US)

(73) Assignee: GoPro, Inc., San Mateo, CA (US)

( * ) Notice: Subject to any disclaimer, the term of this patent is extended or adjusted under 35 U.S.C. 154(b) by 237 days.

(21) Appl. No.: 15/594,380

(22) Filed: May 12, 2017

(51) Int. Cl.
| | |
|---|---|
| *H04N 7/12* | (2006.01) |
| *H04N 11/02* | (2006.01) |
| *H04N 19/126* | (2014.01) |
| *H04N 19/177* | (2014.01) |
| *H04N 19/122* | (2014.01) |
| *H04N 19/105* | (2014.01) |
| *H04N 19/159* | (2014.01) |
| *G06K 9/62* | (2006.01) |
| *H04N 7/18* | (2006.01) |

(52) U.S. Cl.
CPC ......... *H04N 19/126* (2014.11); *G06K 9/6218* (2013.01); *G06K 9/6269* (2013.01); *H04N 7/183* (2013.01); *H04N 19/105* (2014.11); *H04N 19/122* (2014.11); *H04N 19/159* (2014.11); *H04N 19/177* (2014.11)

(58) Field of Classification Search
CPC ........... G06K 9/00456; G06K 9/00785; G06K 9/4628; G06K 9/52; G06K 9/6247; G06K 9/6256; G06K 9/6267; G06K 9/66; G06K 9/0063; G06K 9/03; G06K 9/3233; G06K 9/6203; G06N 3/0454; G06N 3/082; G06N 5/02; Y04S 10/54; H04N 19/103; H04N 19/426; H04N 5/23296
See application file for complete search history.

(56) References Cited

U.S. PATENT DOCUMENTS

| | | | |
|---|---|---|---|
| 2004/0017492 A1 | 1/2004 | Stavely | |
| 2009/0202177 A1 | 8/2009 | Jeffrey | |
| 2011/0044537 A1* | 2/2011 | Cobb | G06K 9/00771 382/165 |
| 2011/0249867 A1* | 10/2011 | Haas | G06K 9/00818 382/103 |
| 2013/0010138 A1* | 1/2013 | Bigioi | G06K 9/00261 348/208.2 |

(Continued)

FOREIGN PATENT DOCUMENTS

| | | |
|---|---|---|
| EP | 2334058 | 9/2016 |
| WO | 2010073192 | 7/2010 |

OTHER PUBLICATIONS

Wang, Yu-Shuen, et al., "Optimized Scale-and-Stretch for Image Resizing", ACM Transactions on Graphics (TOG), ACM, vol. 27, No. 5, Article 118, Dec. 1, 2008, XP002609797, 8 pages.

(Continued)

*Primary Examiner* — Jessica M Prince
(74) *Attorney, Agent, or Firm* — Esplin & Associates, PC

(57) ABSTRACT

Video information defining video content to be encoded may be obtained. Scene composition information for the video content may be obtained. The scene composition information may be determined by a convolutional neural network based on visuals represented within the video content. The video content may be encoded based on the scene composition information. The encoding of the video content may generate encoded video information defining the encoded video content.

17 Claims, 4 Drawing Sheets

(56) References Cited

U.S. PATENT DOCUMENTS

| | | | |
|---|---|---|---|
| 2015/0341535 A1* | 11/2015 | Forutanpour | H04N 5/23293 348/222.1 |
| 2017/0185846 A1* | 6/2017 | Hwangbo | G06K 9/00751 |
| 2017/0308753 A1* | 10/2017 | Wu | G06T 7/62 |
| 2018/0063538 A1* | 3/2018 | Bernal | G06K 9/03 |
| 2018/0268571 A1* | 9/2018 | Park | G06T 9/002 |
| 2018/0300553 A1* | 10/2018 | Khosla | G06K 9/00718 |

OTHER PUBLICATIONS

Hwang, Daw-Sen, et al., "Content-Aware Image Resizing Using Perceptual Seam Carving with Human Attention Model", International Conference on Multimedia and Expo, 2008 IEEE, Piscataway, NJ, Jun. 23, 2008, XP032965469, pp. 1029-1032.

Avidan, S., et al., "Seam Carving for Content-Aware Image Resizing", ACM Transactions on Graphics (TOG), ACM, vol. 26, No. 3, Article 10, Jul. 1, 2007, XP007904203, 10 pages.

* cited by examiner

SYSTEMS AND METHODS FOR ENCODING VIDEOS BASED ON VISUALS CAPTURED WITHIN THE VIDEOS

FIELD

This disclosure relates to encoding videos based on scene composition information determined using a convolutional neural network.

BACKGROUND

Encoding a video with high quality may require high processing time and/or memory, and may result in a large file size. Time, processing, and memory required to encode high quality videos may make it difficult for a user to share high quality videos with other users, especially from a mobile device that captured the videos.

SUMMARY

This disclosure relates to encoding videos based on visuals captured within the videos. Video information defining video content to be encoded may be obtained. Scene composition information for the video content may be obtained. The scene composition information may be determined by a convolutional neural network based on visuals represented within the video content. The video content may be encoded based on the scene composition information. The encoding of the video content may generate encoded video information defining the encoded video content.

A system that encodes videos based on visuals captured within the videos may include one or more processors, and/or other components. The processor(s) may be configured by machine-readable instructions. Executing the machine-readable instructions may cause the processor(s) to facilitate encoding videos based on visuals captured within the videos. The machine-readable instructions may include one or more computer program components. The computer program components may include one or more of a video information component, a scene composition component, an encode component, and/or other computer program components.

The video information component may be configured to obtain video information and/or other information. Obtaining the video information may include one or more of accessing, acquiring, analyzing, determining, examining, locating, receiving, retrieving, reviewing, and/or otherwise obtaining the video information. The video information may define video content to be encoded. In some implementations, the video information may include raw video information generated from one or more image sensors' capture of the video content. The video information component may obtain video information from one or more locations. The video information component may be configured to obtain video information defining video content during capture of the video content and/or after capture of the video content by one or more image sensors.

The scene composition component may be configured to obtain scene composition information for the video content and/or other information. The scene composition information may be determined by one or more convolutional neural networks based on visuals represented within the video content, and/or other information. In some implementations, the determination of the scene composition information may include analysis of the video content in a single color channel. The determination of the scene composition information may include analysis of one or more lower fidelity versions of the video content.

In some implementations, the determination of the scene composition information may include one or more of object identification, face identification, depth identification, activity identification, luminance identification, and/or other visual identification. In some implementations, the determination of the scene composition information may be performed for groupings of frames.

In some implementations, the determination of the scene composition information may be performed by dedicated hardware and/or other components. In some implementations, the processors and/or other components may be located in an image capture device. In some implementations, the image capture device may include one or more action cameras and/or other image capture devices.

The encode component may be configured to encode the video content based on the scene composition information and/or other information. The encoding of the video content may generate encoded video information defining the encoded video content. In some implementations, encoding the video content based on the scene composition information may include setting one or more quantization parameters, block mode type selection, block size selection, transform size selection, one or more intra-frame bit distribution, grouping of pictures setting, and/or other encoding parameters based on the scene composition information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
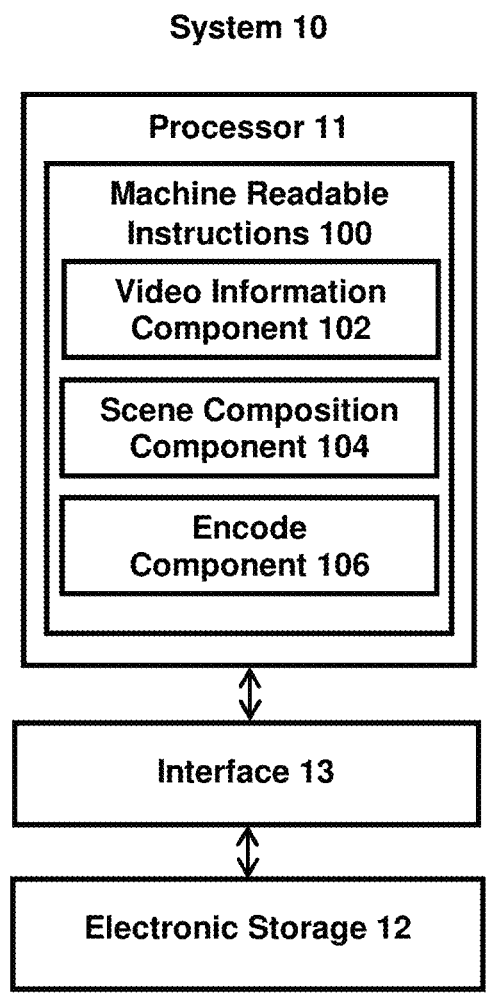
FIG. 1 illustrates an example system that encodes videos based on visuals captured within the videos.

FIG. 1 illustrates a system 10 for encoding videos based on visuals captured within the videos. The system 10 may include one or more of a processor 11, an electronic storage 12, an interface 13 (e.g., bus, wireless interface), and/or other components. Video information defining video content to be encoded may be obtained by the processor 11. Scene composition information for the video content may be obtained by the processor 11. The scene composition information may be determined by a convolutional neural network based on visuals represented within the video content. The video content may be encoded based on the scene composition information. The encoding of the video content may generate encoded video information defining the encoded video content.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to video information, video content, scene composition, identification of scene composition, convolutional neural network, video encoding, and/or other information.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate encoding videos based on visuals captured within the videos. The machine readable instructions 100 may include one or more computer program components. The machine readable instructions 100 may include one or more of a video information component 102, a scene composition component 104, an encode component 106, and/or other computer program components.

The video information component 102 may be configured to obtain video information and/or other information. Obtaining the video information may include one or more of accessing, acquiring, analyzing, determining, examining, locating, receiving, retrieving, reviewing, and/or otherwise obtaining the video information. The video information may define video content to be encoded. For example, the video information may define unencoded video content to be encoded or previously encoded video content to be encoded (re-encoded).

The video information component 102 may obtain video information from one or more locations. For example, the video information component 102 may obtain the video information from a storage location, such as the electronic storage 12, electronic storage of information and/or signals generated by one or more image sensors (not shown in FIG. 1), electronic storage of a device accessible via a network, and/or other locations. The video information component 102 may obtain the video information from one or more hardware components (e.g., an image sensor) and/or one or more software components (e.g., software running on a computing device).

The video information component 102 may be configured to obtain video information defining video content during capture of the video content and/or after capture of the video content by one or more image sensors. For example, the video information component 102 may obtain video information defining video content while the video content is being captured by one or more image sensors. The video information component 102 may obtain video information defining video content after the video content has been captured and stored in memory (e.g., the electronic storage 12, buffer memory).

In some implementations, the video information obtained by the video information component 102 may include raw video information generated from one or more image sensors' capture of the video content. For example, one of more image sensors may generate signals based on light incident on the image sensor(s). The signals generated by the image sensors may convey the raw video information defining the capture of visuals conveyed by the light incident on the image sensor(s). For example, the video information may include RAW/YUV and/or other information regarding the video content captured by the image sensor(s). In some implementations, the video information component 102 may obtain reduced video information. The reduced video information be characterized by lower fidelity (e.g., lower resolution, lower framerate) than the video information. In some implementations, the video component 102 may reduce the video information to reduced video information.

The scene composition component 104 may be configured to obtain scene composition information for the video content and/or other information. The scene composition information may characterize the visual composition of the video content and/or other information. The scene composition information may be determined by one or more convolutional neural networks based on visuals represented within the video content, and/or other information. A convolutional neural network may refer to a neural network that receives an input and transforms the input through a series of layers. A convolutional neural network may include a series of linear and non-linear operations applied to the input. A convolutional neural network may include one or more layers. The layers may define one or more operations on the input to the convolutional neural network. A convolutional neural network may take as an input video/image and output data relating to visuals captured within the video/image. The video information/reduced video information (or portion(s) of the video information/reduced video information) may be fed into one or more convolutional neural networks to obtain the scene composition information.

In some implementations, the determination of the scene composition information may include analysis of the video content in a single color channel. For example, the video information (or portion(s) of the video information) may be processed through convolutional neural network(s) using the Y channel, CBCR channel, and/or both Y and CBCR channels. Uses of other channel(s) of video content are contemplated.

In some implementations, the determination of the scene composition information may include analysis of one or more lower fidelity versions of the video content. Lower fidelity may include one or more of lower resolution, lower framerate, higher compression, and/or other lower fidelity. Lower fidelity versions of the video content may be defined by reduced video information. The scene composition information may be determined using reduced video information. For example, the convolutional neural network(s) may be run on smaller sized YUV images at reduced framerates. Other uses of lower fidelity versions of the video content are contemplated.

In some implementations, the determination of the scene composition information may include one or more of object identification, face identification, depth identification, activity identification, luminance identification, and/or other visual identification. Object identification may include identification of particular objects and/or types of objects. For example, object identification may include identification of particular water/water types particular plant/plant types, particular animal/animal types, particular building/building types, particular environment/environment types, and/or other objection identification. Object identification may include identification of regions based on complexity of the visuals within the regions. For example, object identification may include identification of regions within the video content/image of flat regions versus dense/complex regions.

Face identification may include identification of particular faces and/or types of faces. For example, face identification may include identification of particular faces sought within the video content/image and/or particular types of people's faces (e.g., showing particular emotion(s)). Depth identification may include identification of depths of objects of faces within the video content. For example, depth identification may include which objects/faces are located with the foreground versus the background of the video content/image. Activity identification may include identification of particular activities and/or types of activity within the video content. For example, activity identification may include identification of still or moving activity within the video content, a single image, and/or across multiple images. Luminance identification may include identification of particular regions based on luminance within the regions. For example, luminance identification may include identification of regions with luminance above a threshold, regions with luminance below a threshold, and/or regions with luminance within a range.

Figure 3:
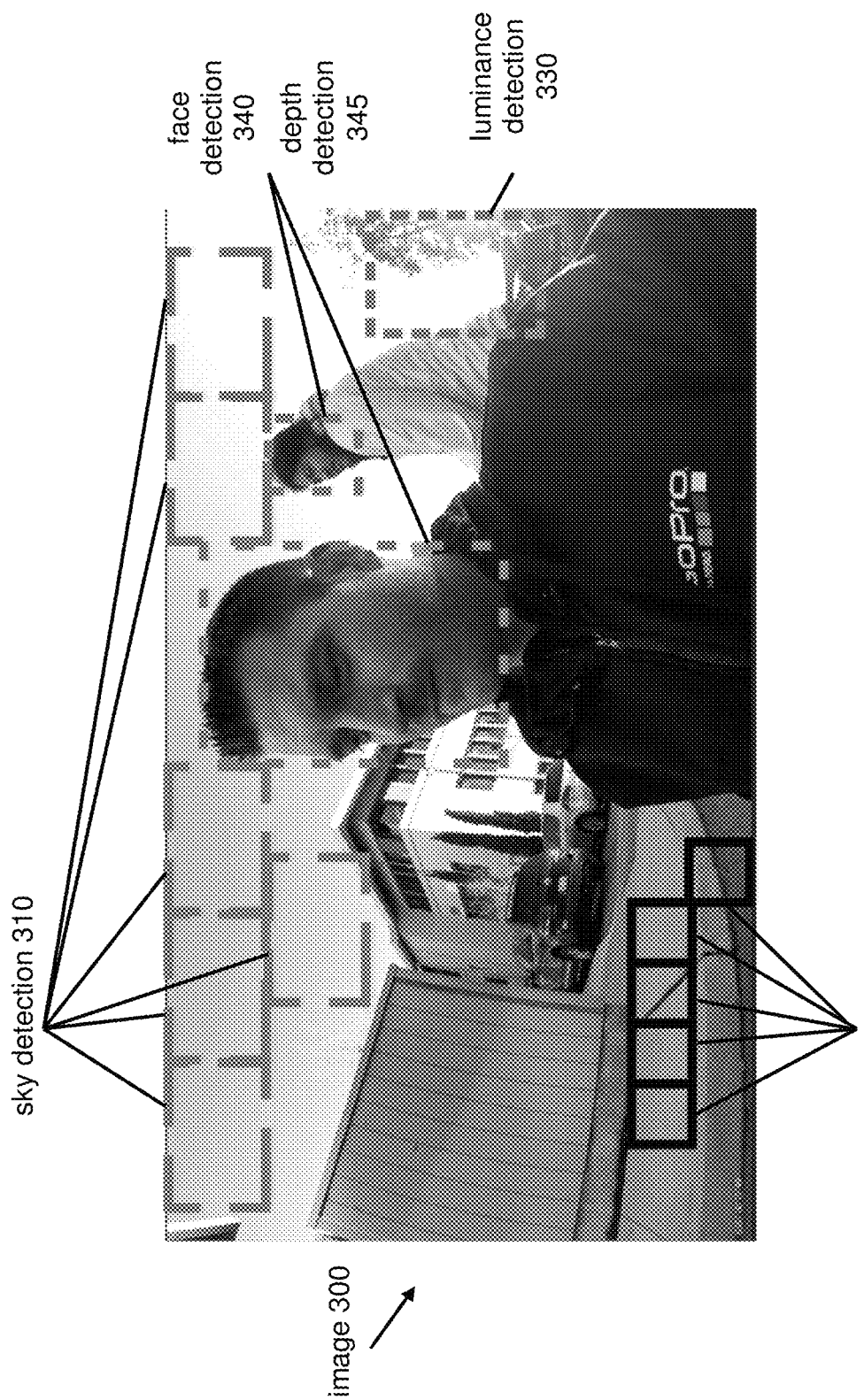
FIG. 3 illustrates an example determination of scene composition information for an image.

FIG. 3 illustrates an example determination of scene composition information for an image 300. Determination of scene composition for the image 300 may include sky detection 310 (identifying regions within the image 300 including sky), pavement detection 320 (identifying regions within the image 300 including pavement), luminance detection 330 (identifying regions within the image 300 including particular luminance), face detection 340 (identifying regions within the image 300 including face), depth detection 345 (identifying depths of objects within the image 300), and/or other visual identification. One or more visual identification may relate to the same region(s) within the image. For example, the face detection 340 and the depth detection 345 may be performed for the same two rectangular areas within the image 300 to determine which of the faces are in the foreground and which of the faces are in the background.

In some implementations, the determination of the scene composition information may be performed per frame or for groupings of frames. For example, the scene component information may be determined for every frame within the video content. For example, the scene composition information may be determined for groupings of certain numbers of frames (e.g., the video content may have been captured at 60 frames per second and the scene component information may be determined at 30 frames per second (determine per groupings of 2 frames)). The groupings may include the same number of frames or different numbers of frames. For example, based on detection of fast activity within the video content, the scene composition information may be determined for groupings of small numbers of frames and by dynamically inserting reference frames. Based on detection of slow/non-moving activity, the scene composition information may be determined for groupings of large numbers of frames. Grouping the frames for scene composition information determination effectuates skipping frames for analysis. Skipping frames may improve the time required to perform the analysis at the cost of accuracy in determining scene composition information.

In some implementations, the determination of the scene composition information may be performed by dedicated hardware and/or other components. In some implementations, the processors and/or other components (e.g., dedicated hardware) may be located in an image capture device. In some implementations, an image capture device may include one or more action cameras and/or other image capture devices. For example, some or all of the components of the system 10 may be included within an action camera. An action camera may refer to a camera designed for filming action while being part of the action. For example, an action camera may be mounted on a moving object (e.g., surfboard, bikes, person) to capture some or all of the motion associated with an action taken by the moving object. An action camera may be compact, rugged, and/or waterproof. In some implementations, the system 10 may include one or more components generally associated with action cameras, such as optical element, image sensor, wireless communication, battery, housing, water resistance, location sensor (e.g., GPS), motion sensor, orientation sensor, audio sensor, motion/voice control, image/video stabilization, and/or other components.

Evolution of low power digital signal processors for convolutional neural networks have made it possible to use computer vision in cameras, smartphones, tablets, and other mobile devices via dedicated hardware. However, the use of dedicated hardware for convolutional neural networks in low power mobile devices have been limited to identifying objects, such as human faces, and tagging objects. The dedicated hardware of image capture devices that performs convolutional neural network operations may be used to collect information regarding scene composition of video content and provide that information to other components of the image capture device (e.g., encoder) so that the video content may be encoded based on the scene composition (e.g., distribute bits based on scene complexity, image saliency, and/or other visual identifications).

Figure 4:
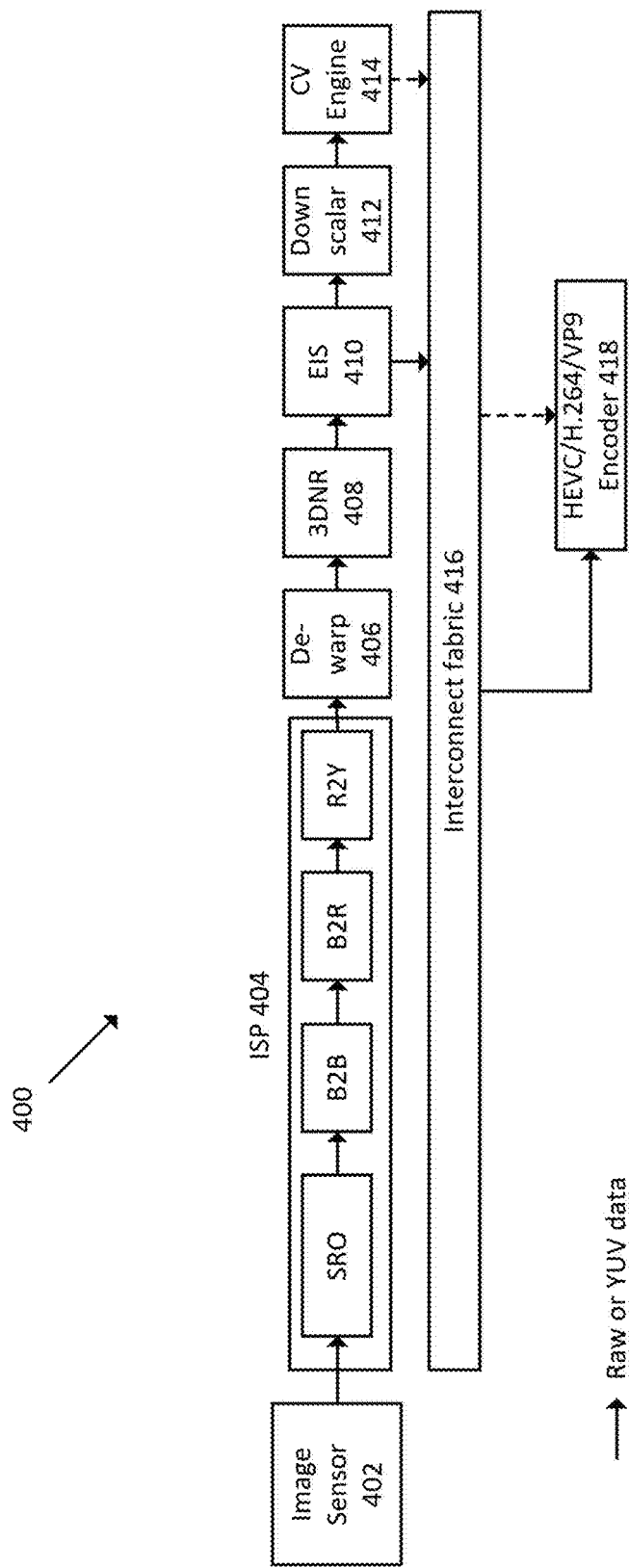
FIG. 4 illustrates an example image capture system data flow.

For example, FIG. 4 illustrates an example image capture system data flow 400. In the data flow 400, RAW/YUV data may be passed from an image sensor 402 to an ISP 404. The ISP 404 may perform various operations on the RAW/YUV data and pass the processed data to dewarp 406, 3DNR 408, EIS 410, downscalar 412, and CV engine 414. The ESI 410 may pass the RAW/YUV data to an interconnect fabric 416 to be passed to an encoder 418 (e.g., HEVC/H.264/VP9). The CV engine 414 may pass the scene composition information (e.g., CNN statistics data) to the interconnect fabric 416 to be passed to the encoder 418. The encoder may use the scene composition information to encode the RAW/YUV data.

The encode component 106 may be configured to encode the video content based on the scene composition information and/or other information. The encode component 106 may encode the video content using different compression/bitrates for different moments in the video content (e.g., different compression/bitrates for different frames within the video content) based on the scene composition information and/or other information. The encode component 106 may encode the video content using different compression/bitrates for different regions of the video content (e.g., different compression/bitrates for different regions within a frame of the video content) based on the scene composition information and/or other information. The encoding of the video content may generate encoded video information defining the encoded video content. The encoded video information may define the encoded video content in one or more particular formats.

In some implementations, encoding the video content based on the scene composition information may include setting one or more quantization parameters, a block mode type selection (e.g. Intra vs Inter vs Skip), a block size selection (e.g. 4×4, 8×8, 16×16), a transform size selection (e.g. 4×4, 8×8, 16×16), one or more intra-frame bit distribution, grouping of pictures setting and/or other encoding parameters based on the scene composition information. For example, the scene composition information may include tagging of regions within the video content using convolutional neural network statistics data, and the convolutional neural network statistics data may be synchronized with the YUV data for encoding. The encode component (e.g., the encoder 418) may use these statistics during (pre) analysis of encode to determine one or more encoding parameters.

Quantization parameters (QP) may regulate how much visual details are saved when encoding video content/image(s). Small QP may correspond to large amounts of details being saved while large QP may correspond to small amounts of details being saved. As QP is increased, details within the video content/image may be aggregated, which may result in lower bitrates/higher distortion. By setting the QP based on scene composition information, the encode component 106 may vary QP based on visuals within the video content/image(s) (e.g., object, face, activity recognition) so that each region/image/groupings of images are provided with allocation of bits to store the appropriate amount of details.

Intra-frame-bit distribution may define how the bits for storing visual information are distributed across a single image (e.g., a single video frame). Using intra-frame bit distribution may enable the encode component 106 to utilize weight control for different visuals (e.g., providing more bits to important/desired details, less bits to unimportant/less desired details). Using intra-frame bit distribution may enable the encode component 106 to provide for front vs back bit distribution (e.g., providing more bits to objects in the foreground than in the background). Using intra-frame bit distribution may enable the encode component 106 to provide for complex vs flat region bit distribution (e.g., providing more bits to complex regions to flat regions).

Grouping of pictures setting may determine the size(s) of group of pictures (GOP) for the video content and or the structure of the GOP. A GOP may include a collection of sequential images within an encoded video stream. A GOP may include one or more of an I-frame, a P-frame, a B-frame, a D-frame, and/or other frames. The grouping of pictures setting may determine the types of frames included within a GOP, the number of frames within the GOP, and/or the arrangement of frames within the GOP. In some implementations, one or more reference frames may be inserted dynamically based on the scene composition information (e.g., detection of particular motion/amounts of motion/visuals within video content/image(s)).

In some implementations, one or more parameters set by the encode component 106 may be determined/changed based on user input. For example, the encode component 106 may initially set low bit distribution for sky regions in an image (e.g., regions corresponding to sky detection 310). The low bit distribution may cause the encoded sky regions to look blocky. A user may wish to prevent blocky visuals within flat areas, such as the sky regions, and change the amount of bit distribution for sky regions in the image. Other settings/changes of encoding parameters are contemplated.

Use of scene composition information to encode video content may enable a mobile device (e.g., image capture device, smartphone, tablet) to intelligently encode the video content based on visuals captured within the video content. Mobile devices may be power-constrained (have limited battery power) and may be required to provide real time encoding while also provide high quality video content at low bit rates. Mobile devices may have limited storage (e.g., DDR storage) for real time analysis of visuals captured within video content. Further, sharing of images/videos at the moment of capture (e.g., with other devices that have limited storage, server/social media via limited bandwidth) further places premium on faster encoding times and small sizes for the encoded video content. Intelligently encoding the video content based on the scene composition information may enable the mobile device to provide high quality video content with lower resource consumption (e.g., time, processing, and memory).

In some implementations, video content may include one or more of spherical video content, virtual reality content, and/or other video content. Spherical video content and/or virtual reality content may define visual content viewable from one or more points of view as a function of progress through the spherical/virtual reality video content.

Spherical video content may refer to a video capture of multiple views from a single location. Spherical video content may include a full spherical video capture (360 degrees of capture) or a partial spherical video capture (less than 360 degrees of capture). Spherical video content may be captured through the use of one or more cameras/image sensors to capture images/videos from a location. The captured images/videos may be stitched together to form the spherical video content.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components.

While the computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11 may be configured to execute one or more additional computer program components that may perform some or all of the functionality attributed to one or more of computer program components described herein.

In some implementations, some or all of the functionalities of the computer program components/systems describes herein may be provided by one or more external resources. External sources may include hosts/sources of information, computing, and/or processing and/or other providers of information, computing, and/or processing outside of the system 10.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
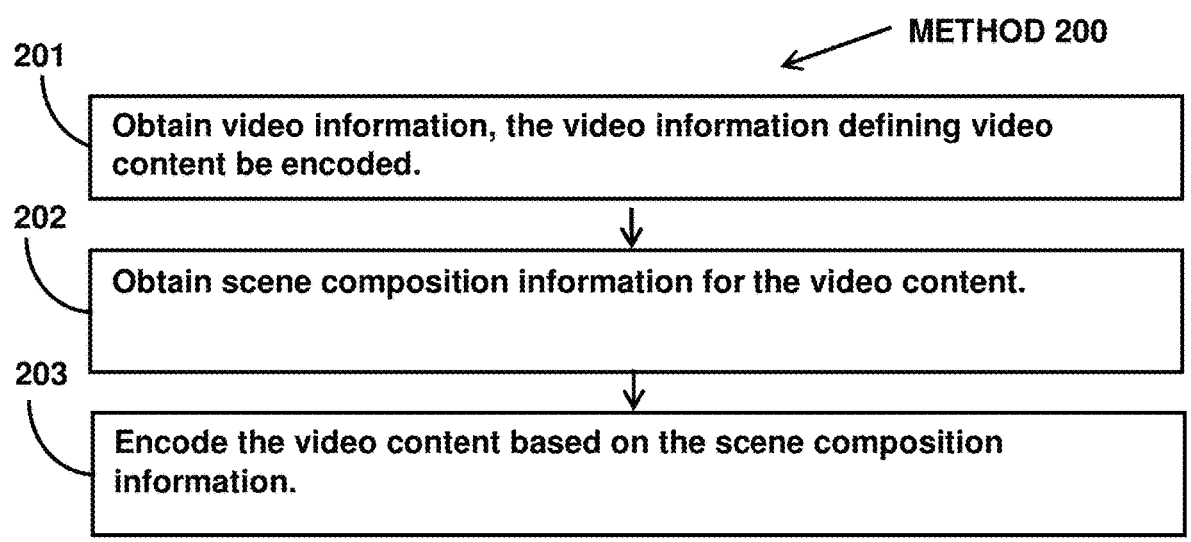
FIG. 2 illustrates an example method for encoding videos based on visuals captured within the videos.

FIG. 2 illustrates method 200 for encoding videos based on visuals captured within the videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information may be obtained. The video information may define video content to be encoded. In some implementation, operation 201 may be performed by a processor component the same as or similar to the video information component 102 (Shown in FIG. 1 and described herein).

At operation 202, scene composition information for the video content may be obtained. The scene composition information may be determined by a convolutional neural network based on visuals represented within the video content. In some implementations, operation 202 may be performed by a processor component the same as or similar to the scene composition component 104 (Shown in FIG. 1 and described herein).

At operation 203, the video content may be encoded based on the scene composition information. The encoding of the video content may generate encoded video information defining the encoded video content. In some implementations, operation 203 may be performed by a processor component the same as or similar to the encode component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that encodes videos based on visuals captured within the videos, the system comprising:
one or more physical processors configured by machine-readable instructions to:
obtain video information, the video information defining video content to be encoded;
obtain scene composition information for the video content, the scene composition information determined by a convolutional neural network based on visuals represented within the video content, wherein the determination of the scene composition information includes object identification of a first object within the video content or face identification of a first face within the video content and depth identification of the first object or the first face within the video content, the depth identification including identification of whether the first object or the first face is located within a foreground or a background of the video content; and
encode the video content based on the scene composition information, the encoding of the video content generating encoded video information defining the encoded video content;
wherein:
the video content includes frames;
the determination of the scene composition information is performed for groupings of frames, wherein the determination of the scene composition information is performed for a first grouping of frames including a first number of frames and for a second grouping of frames including a second number of frames; and
number of frames within individual groupings of frames is determined based on detection of speed of activity within the frames such that the first grouping of frames includes the first number of frames based on detection of fast activity and the second grouping of frames includes the second number of frames based on detection of slow activity, the second number of frames being greater than the first number of frames.

2. The system of claim 1, wherein the video information includes raw video information generated from an image sensor's capture of the video content.

3. The system of claim 1, wherein the determination of the scene composition information includes analysis of a lower fidelity version of the video content.

4. The system of claim 1, wherein the determination of the scene composition information includes analysis of the video content in a single color channel.

5. The system of claim 1, wherein the determination of the scene composition information is performed by dedicated hardware.

6. The system of claim 1, wherein the determination of the scene composition information further includes one or more of activity identification and luminance identification.

7. The system of claim 1, wherein the one or more physical processors are, to encode the video content based on the scene composition information, further configured by the machine-readable instructions to set at least one of a quantization parameter, a block mode type selection, a block size selection, a transform size selection, an intra-frame bit distribution, or grouping of pictures setting based on the scene composition information.

8. The system of claim 1, wherein the one or more physical processors are located in an image capture device.

9. A method for encoding videos based on visuals captured within the videos, the method comprising:
obtaining video information, the video information defining video content to be encoded;
obtaining scene composition information for the video content, the scene composition information determined by a convolutional neural network based on visuals represented within the video content, wherein the determination of the scene composition information includes object identification of a first object within the video content or face identification of a first face within the video content and depth identification of the first object or the first face within the video content, the depth identification including identification of whether the first object or the first face is located within a foreground or a background of the video content; and
encoding the video content based on the scene composition information, the encoding of the video content generating encoded video information defining the encoded video content;
wherein:
the video content includes frames;
determining the scene composition information is performed for groupings of frames, wherein the determination of the scene composition information is performed for a first grouping of frames including a first number of frames and for a second grouping of frames including a second number of frames; and
number of frames within individual groupings of frames is determined based on detection of speed of activity within the frames such that the first grouping of frames includes the first number of frames based on detection of fast activity and the second grouping of frames includes the second number of frames based on detection of slow activity, the second number of frames being greater than the first number of frames.

10. The method of claim 9, wherein the video information includes raw video information generated from an image sensor's capture of the video content.

11. The method of claim 9, wherein determining the scene composition information includes analyzing a lower fidelity version of the video content.

12. The method of claim 9, wherein determining the scene composition information includes analyzing the video content in a single color channel.

13. The method of claim 9, wherein determining the scene composition information is performed by dedicated hardware.

14. The method of claim 9, wherein determining the scene composition information further includes identifying one or more of an activity and luminance.

15. The method of claim 9, wherein encoding the video content based on the scene composition information includes setting at least one of a quantization parameter, a block mode type selection, a block size selection, a transform size selection, an intra-frame bit distribution, or grouping of pictures setting based on the scene composition information.

16. The method of claim 9, wherein encoding the video content is performed by one or more processors of an image capture device.

17. A system that encodes videos based on visuals captured within the videos, the system comprising:
one or more physical processors configured by machine-readable instructions to:
obtain video information, the video information defining video content to be encoded;
obtain scene composition information for the video content, the scene composition information determined by a convolutional neural network based on visuals represented within the video content, wherein:
the determination of the scene composition information is performed by dedicated hardware; and
the determination of the scene composition information includes object identification of a first object within the video content or face identification of a first face within the video content and depth identification of the first object or the first face within the video content, the depth identification including identification of whether the first object or the first face is located within a foreground or a background of the video content; and
encode the video content based on the scene composition information, the encoding of the video content generating encoded video information defining the encoded video content, wherein encoding the video content based on the scene composition information includes setting at least one of a quantization parameter, a block mode type selection, a block size selection, a transform size selection, an intra-frame bit distribution, or grouping of pictures setting based on the scene composition information
wherein:
the video content includes frames;
the determination of the scene composition information is performed for groupings of frames, wherein the determination of the scene composition information is performed for a first grouping of frames including a first number of frames and for a second grouping of frames including a second number of frames; and
number of frames within individual groupings of frames is determined based on detection of speed of activity within the frames such that the first grouping of frames includes the first number of frames based on detection of fast activity and the second grouping of frames includes the second number of frames based on detection of slow activity, the second number of frames being greater than the first number of frames.

* * * * *